(12) United States Patent
Chakraborty et al.

(10) Patent No.: US 11,578,868 B1
(45) Date of Patent: Feb. 14, 2023

(54) COMBUSTOR WITH ALTERNATING DILUTION FENCE

(71) Applicant: General Electric Company, Schenectady, NY (US)

(72) Inventors: Krishnendu Chakraborty, Bengaluru (IN); Pradeep Naik, Bengaluru (IN); Saket Singh, Bengaluru (IN); Shai Birmaher, Cincinnati, OH (US); Rimple Rangrej, Bengaluru (IN); Daniel J. Kirtley, Blue Ash, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/808,158

(22) Filed: Jun. 22, 2022

(30) Foreign Application Priority Data

Jan. 27, 2022 (IN) .............................. 202211004468

(51) Int. Cl.
*F23R 3/06* (2006.01)
*F23R 3/26* (2006.01)
*B33Y 80/00* (2015.01)

(52) U.S. Cl.
CPC .................. *F23R 3/06* (2013.01); *F23R 3/26* (2013.01); *B33Y 80/00* (2014.12); *F23R 2900/03042* (2013.01)

(58) Field of Classification Search
CPC .... F23R 3/04; F23R 3/045; F23R 3/50; F23R 3/06; F23R 3/26; F23R 2900/03042; B33Y 80/00
See application file for complete search history.

(56) References Cited

U.S. PATENT DOCUMENTS

| 4,232,527 | A | 11/1980 | Reider |
| 4,653,279 | A | 3/1987 | Reynolds |
| 5,481,867 | A * | 1/1996 | Dubell ...................... F23R 3/04 60/39.27 |
| 8,109,099 | B2 | 2/2012 | Tu et al. |
| 9,217,568 | B2 | 12/2015 | Cunha et al. |
| 9,335,049 | B2 * | 5/2016 | Cunha ..................... F23R 3/007 |
| 9,939,154 | B2 | 4/2018 | Cunha |
| 10,094,573 | B2 | 10/2018 | Kim et al. |
| 10,174,947 | B1 * | 1/2019 | Clemen ..................... F23R 3/06 |

(Continued)

FOREIGN PATENT DOCUMENTS

EP 2144002 B1 9/2016

*Primary Examiner* — Jason H Duger
(74) *Attorney, Agent, or Firm* — Venable LLP; Edward A. Kmett; Michele V. Frank (57) ABSTRACT

A combustor liner for a combustor of a gas turbine includes an outer liner and an inner liner. At least one of the outer liner and the inner liner has an upstream liner portion and a downstream liner portion with an annular gap therebetween. At least one dilution flow assembly is arranged to bridge across the annular gap. The at least one dilution flow assembly includes an upstream liner panel and a downstream liner panel with a dilution opening provided between the upstream liner panel and the downstream liner panel, and a plurality of dilution fence members arranged within the dilution opening and extending into a combustion chamber. The plurality of dilution fence members are arranged in successive arrangement in a circumferential direction and are arranged such that successive dilution fence members are alternatingly offset in an axial direction.

20 Claims, 8 Drawing Sheets

(56) References Cited

U.S. PATENT DOCUMENTS

| 10,753,283 | B2 | 8/2020 | Lao | |
|---|---|---|---|---|
| 11,255,543 | B2* | 2/2022 | Amble | F23R 3/06 |
| 2022/0299206 | A1* | 9/2022 | Quach | F23R 3/50 |

* cited by examiner

COMBUSTOR WITH ALTERNATING DILUTION FENCE

CROSS REFERENCE TO RELATED APPLICATIONS

The present application claims the benefit of Indian Patent Application No. 202211004468, filed on Jan. 27, 2022, which is hereby incorporated by reference herein in its entirety.

TECHNICAL FIELD

The present disclosure relates to a dilution of combustion gases in a combustion chamber of a gas turbine engine. In more detail, the present disclosure relates to a combustor with an alternating dilution fence for dilution of combustion gases.

BACKGROUND

In conventional gas turbine engines, it has been known to provide a flow of dilution air into a combustion chamber downstream of a primary combustion zone. Conventionally, an annular combustor liner may include both an inner liner and an outer liner forming a combustion chamber between them. The inner liner and the outer liner may include dilution holes through the liners that provide a flow of air (i.e., a dilution jet) from a passage surrounding the annular combustor liner into the combustion chamber. Some applications have been known to use circular holes for providing dilution air flow to the combustion chamber. The flow of air through the circular dilution holes in the conventional combustor mixes with combustion gases within the combustion chamber to provide quenching of the combustion gases. High temperature regions seen behind the dilution jet (i.e., in the wake region of dilution jet) are associated with high NOx formation. In addition, the circular dilution air jet does not spread laterally, thereby creating high temperatures in-between dilution jets that also contribute to high NOx formation.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In a combustion section of a turbine engine, air flows through an outer passage surrounding a combustor liner, and through an inner passage surrounding the combustor liner. The air generally flows from an upstream end of the combustor liner to a downstream end of the combustor liner. Some of the airflow in both the outer passage and the inner passage is diverted through dilution holes in the combustor liner and into the combustion chamber as dilution air. One purpose of the dilution airflow is to cool (i.e., quench) combustion gases within the combustion chamber before the gases enter a turbine section. However, quenching of the product of combustion from the primary zone must be done quickly and efficiently so that regions of high temperature can be minimized, and thereby NOx emissions from the combustion system can be reduced.

The present disclosure aims to reduce the NOx emissions by improving the dilution quenching of the hot combustion gases from the primary combustion zone. According to the present disclosure, a combustor liner includes a dilution flow assembly that connects an upstream liner portion and a downstream liner portion, where the dilution flow assembly includes a plurality of dilution fence members alternatingly arranged within a dilution opening. Extending circumferentially about the combustor liner, the dilution fence members are arranged alternatingly upstream and downstream of one another. In various arrangements, the upstream dilution fence members can provide deeper penetration of the dilution air into the combustion chamber, and can be arranged at an angle to provide the dilution air in an upstream direction. As a result, the upstream dilution fence members can provide greater turbulence for mixing with the combustion gases so as to provide better quenching of the combustion gases. The downstream dilution fence members can provide the dilution air closer to the liner downstream of the dilution zone so as to reattach the dilution air faster and provide better cooling of the liner. As a result, better mixing and higher turbulence of the dilution air with the combustion gases can be achieved, thereby reducing the NOx emissions.

Figure 1:
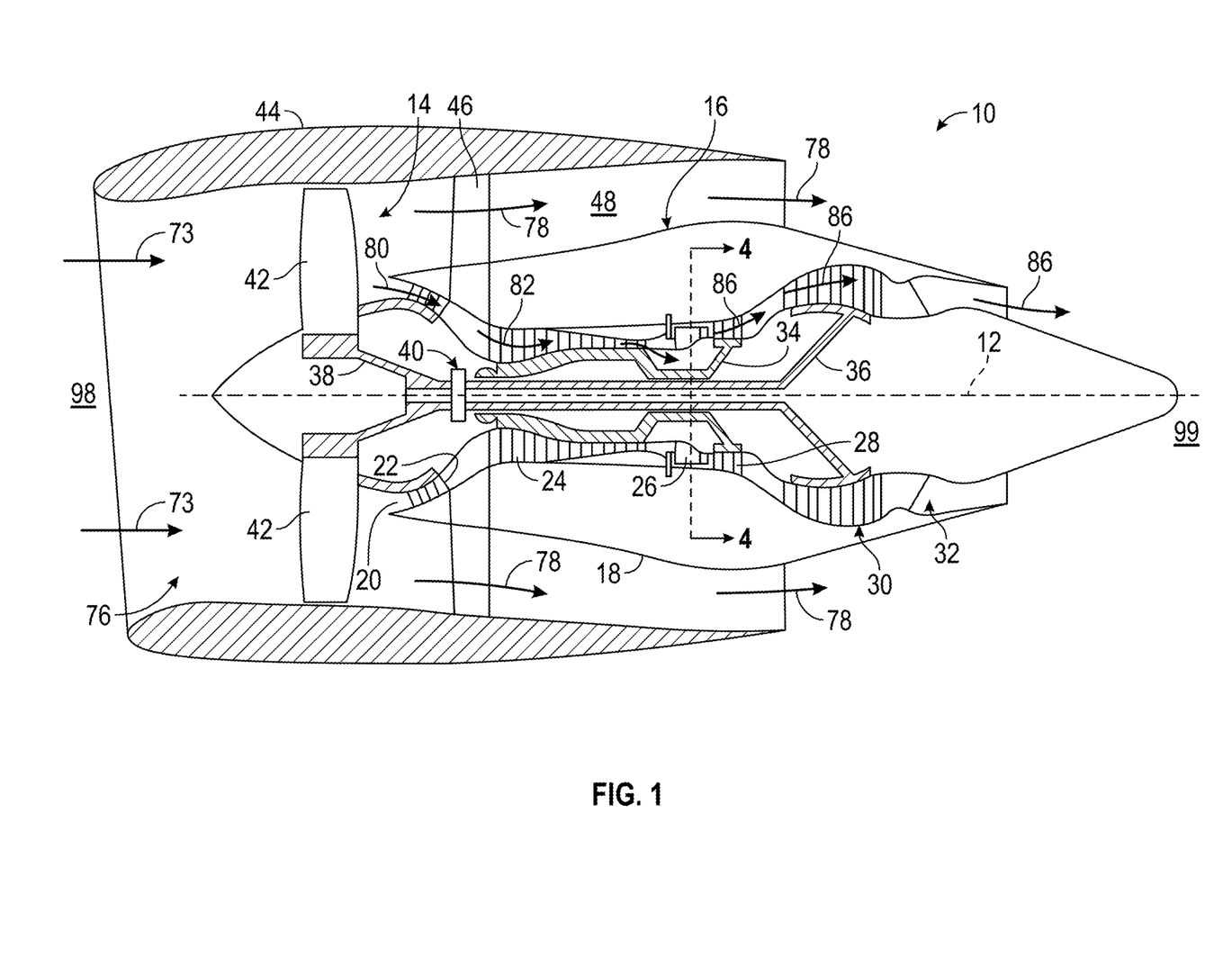
FIG. 1 is a schematic partially cross-sectional side view of an exemplary high by-pass turbofan jet engine, according to an aspect of the present disclosure.

Referring now to the drawings, FIG. 1 is a schematic partially cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has an axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section (22/24) having a booster or low pressure (LP) compressor 22 and a high pressure (HP) compressor 24, a combustor 26, a turbine section (28/30), including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to, and that extend radially outwardly from, the fan shaft 38. An annular fan casing, or nacelle 44, circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16, so as to define a bypass airflow passage 48 therebetween.

Figure 2:
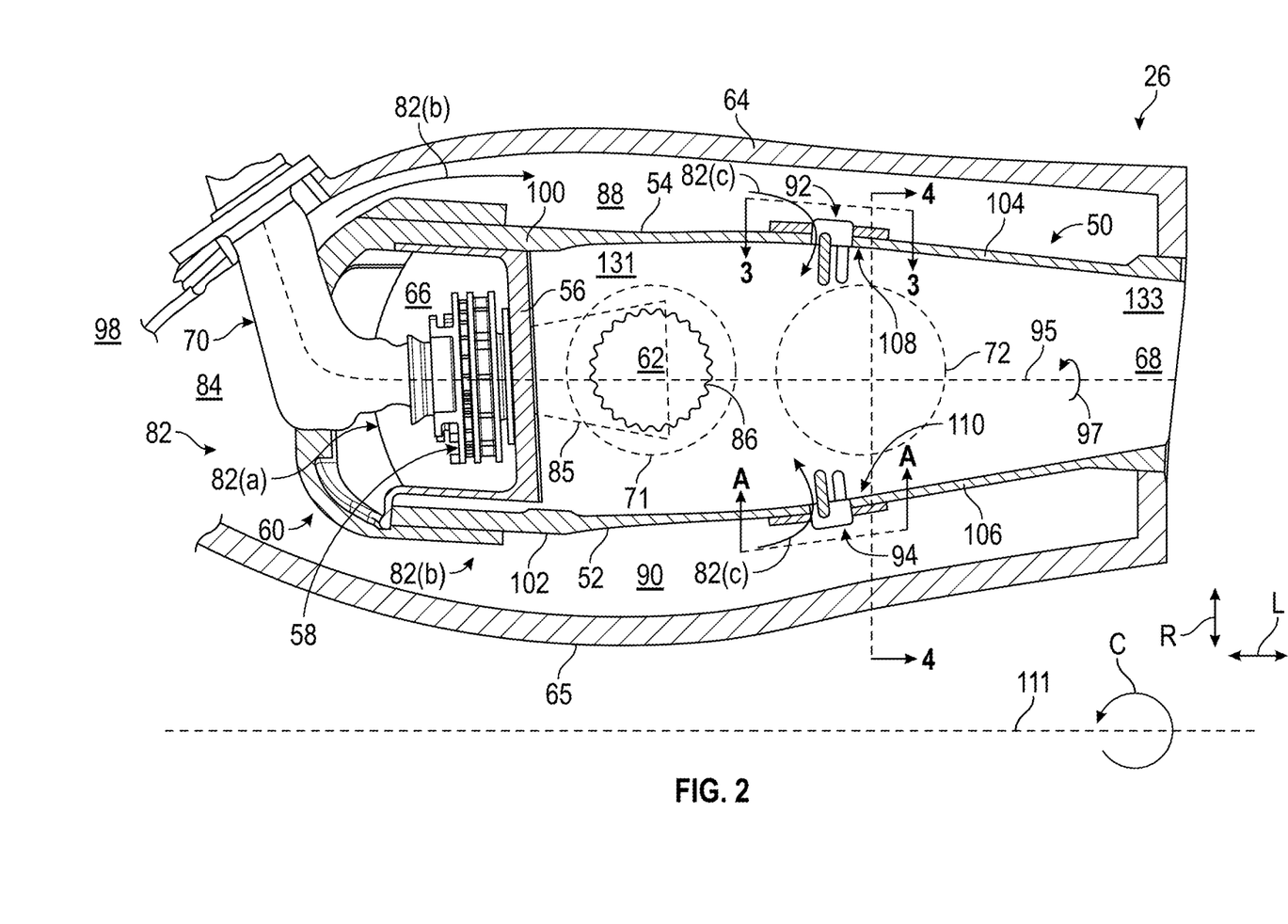
FIG. 2 is a cross-sectional side view of an exemplary combustion section, according to an aspect of the present disclosure.

FIG. 2 is a cross-sectional side view of an exemplary combustor 26 of the core engine 16 as shown in FIG. 1. As shown in FIG. 2, the combustor 26 may generally define a combustor centerline 111, that may correspond to the axial centerline axis 12 (FIG. 1), and, while FIG. 2 depicts a partial cross-sectional view, the combustor 26 extends circumferentially about the combustor centerline 111. The combustor 26 also generally defines an axial direction (L) along the combustor centerline 111, a radial direction (R) extended from the combustor centerline 111, and a circumferential direction (C) extending about the combustor centerline 111. The combustor 26 includes a combustor liner 50 having an inner liner 52 and an outer liner 54, a cowl 60, and a dome assembly 56. The outer liner 54 and the inner liner 52 extend circumferentially about the combustor centerline 111. The dome assembly 56 extends radially between the outer liner 54 and the inner liner 52, and also extends circumferentially about the combustor centerline 111. Together, the inner liner 52, the outer liner 54, and the dome assembly 56 define a combustion chamber 62 that extends circumferentially about the combustor centerline 111. Both the inner liner 52 and the outer liner 54 extend from an upstream end 131 of the combustion chamber 62 to a downstream end 133 of the combustion chamber 62. The combustion chamber 62 may more specifically define various regions, including a primary combustion zone 71 at which initial chemical reaction of a fuel-oxidizer mixture and/or recirculation of combustion gases 86 may occur before flowing further downstream to a dilution zone 72. In dilution zone 72, as will be described in more detail below, the combustion gases 86 may be mixed with compressed air 82(c) before flowing through a turbine inlet 68 to the HP turbine 28 and the LP turbine 30 (FIG. 1).

The outer liner 54 is seen to include an upstream liner portion 100 that extends from the upstream end 131 of the combustion chamber 62 to the dilution zone 72 of the combustion chamber 62, an outer liner downstream liner portion 104 that extends from the dilution zone 72 of the combustion chamber 62 to the downstream end 133 of the combustion chamber 62, and an outer liner annular gap 108 through the outer liner 54 at the dilution zone 72. As will be described in more detail below, an outer liner dilution flow assembly 92 bridges across the outer liner annular gap 108 to connect the upstream liner portion 100 of the outer liner 54 and the downstream liner portion 104 of the outer liner 54. Similarly, the inner liner 52 is seen to include an inner liner upstream liner portion 102 that extends from the upstream end 131 of the combustion chamber 62 to the dilution zone 72 of the combustion chamber 62, an inner liner downstream liner portion 106 that extends from the dilution zone 72 of the combustion chamber 62 to the downstream end 133 of the combustion chamber 62, and an inner liner annular gap 110 through the inner liner 52 at the dilution zone 72. An inner liner dilution flow assembly 94 bridges across the inner liner annular gap 110 to connect the inner liner upstream liner portion 102 and the inner liner downstream liner portion 106. Both the outer liner dilution flow assembly 92 and the inner liner dilution flow assembly 94 extend circumferentially about the combustor centerline 111. Various aspects of the outer liner dilution flow assembly 92 and the inner liner dilution flow assembly 94 will be described in more detail below.

As shown in FIG. 2, the inner liner 52 may be encased within an inner casing 65 and the outer liner 54 may be encased within an outer casing 64. An outer oxidizer flow passage 88 is defined between the outer casing 64 and the outer liner 54, and an inner oxidizer flow passage 90 is defined between the inner casing 65 and the inner liner 52. Generally, the outer liner dilution flow assembly 92 and the inner liner dilution flow assembly 94 provide a flow of compressed air 82(c) from the outer oxidizer flow passage 88 and the inner oxidizer flow passage 90, respectively, into the dilution zone 72 of the combustion chamber 62. The flow of compressed air 82(c) can thus be utilized to provide quenching of the combustion gases 86 in the dilution zone 72 so as to cool the flow of combustion gases 86 entering the turbine section (28/30).

In the cross-sectional view of FIG. 2, the combustor 26 is seen to include a swirler assembly 58 and a fuel nozzle assembly 70 connected with the swirler assembly 58. As is generally known, however, the combustor 26 includes a plurality of swirler assemblies 58 connected to respective openings (not shown) in the dome assembly 56, with the plurality of swirler assemblies 58 being circumferentially spaced about the combustor centerline 111. Similarly, a plurality of fuel nozzle assemblies 70 are provided for the respective plurality of swirler assemblies 58. Thus, the cross-sectional view depicted in FIG. 2 is merely representative of one of the plurality of swirler assemblies 58 and the fuel nozzle assemblies 70.

During operation of the engine 10, as shown in FIGS. 1 and 2 collectively, a volume of air 73, as indicated schematically by arrows, enters the engine 10 from the upstream end 98 through an associated inlet 76 of the nacelle 44 and/or the fan assembly 14. As the volume of air 73 passes across the fan blades 42, a portion of the air 73, as indicated schematically by arrows 78, is directed or routed into the bypass airflow passage 48, while another portion of the air 80, as indicated schematically by an arrow, is directed or routed into the LP compressor 22. The air 80 is progressively compressed as it flows through the LP compressor 22 and the HP compressor 24 towards the combustor 26.

Referring to FIG. 2, the now compressed air 82, as indicated schematically by an arrow, flows into a diffuser cavity 84 of the combustor 26 and pressurizes the diffuser cavity 84. A first portion of the compressed air 82, as indicated schematically by arrows 82(a), flows from the diffuser cavity 84 into a pressure plenum 66 within the cowl 60, where it is then swirled and mixed by the swirler assembly 58 with fuel provided from the fuel nozzle assembly 70 to generate a swirled fuel/oxidizer mixture 85 that is then ignited and burned to generate the combustion gases 86. The swirled fuel/oxidizer mixture 85 may be swirled about a swirler centerline 95 in a swirler flow direction 97, that may be either clockwise about the swirler centerline 95 or may be counterclockwise about the swirler centerline 95. A second portion of the compressed air 82 entering the diffuser cavity 84, as indicated schematically by arrows 82(b), may be used for various purposes other than combustion. For example, as shown in FIG. 2, compressed air 82(b) may be routed into the outer oxidizer flow passage 88 and into the inner oxidizer flow passage 90. A portion of the compressed air 82(b), schematically shown with an arrow as compressed air 82(c), may then be routed from the outer oxidizer flow passage 88 through the outer liner dilution flow assembly 92 and into the dilution zone 72 of combustion chamber 62 to provide quenching of the combustion gases 86 in dilution zone 72. The compressed air 82(c) may also provide turbulence to the flow of the combustion gases 86 so as to provide better mixing of the compressed air 82(c) with the combustion gases 86. A similar flow of the compressed air 82(c) from the inner oxidizer flow passage 90 through the inner liner dilution flow assembly 94 of the inner liner 52 occurs. In addition, or in the alternative, at least a portion of compressed air 82(b) may be routed out of the diffuser cavity 84 through various flow passages (not shown) to provide cooling air to at least one of the HP turbine 28 or the LP turbine 30.

Referring back to FIGS. 1 and 2 collectively, the combustion gases 86 generated in the combustion chamber 62 flow from the combustor 26 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at the downstream end 99.

Figure 3:
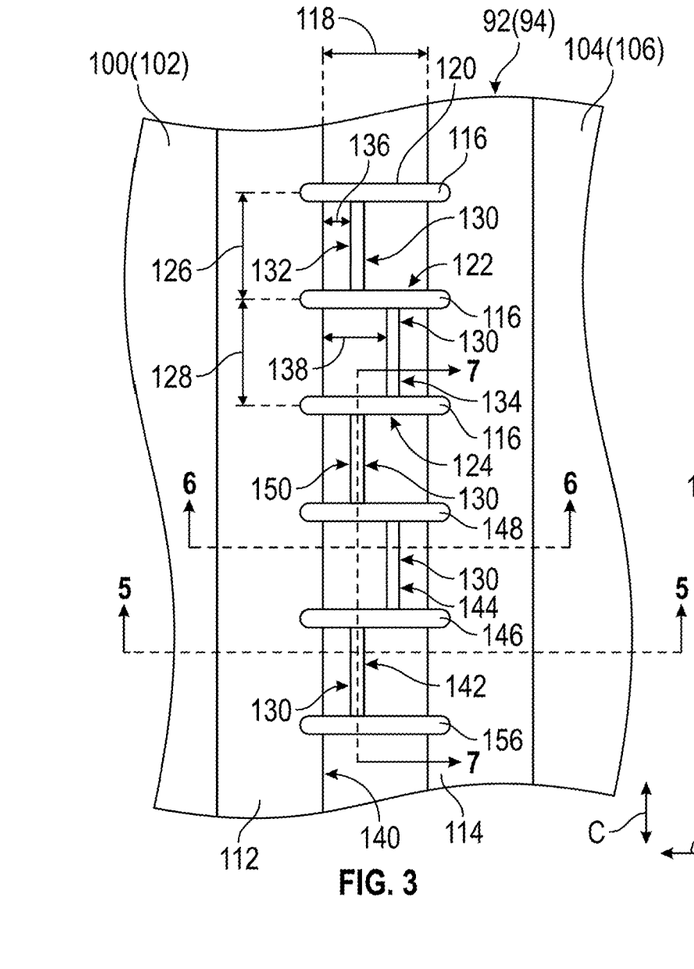
FIG. 3 is a top view depicting a portion of an exemplary dilution flow assembly, taken at view 3-3 or A-A in FIG. 2, according to an aspect of the present disclosure.

FIG. 3 is a top view depicting a portion of an exemplary dilution flow assembly, such as the outer liner dilution flow assembly 92, according to an aspect of the present disclosure. It is noted that the FIG. 3 top view is also applicable to the inner liner dilution flow assembly 94 of the inner liner 52, and the FIG. 3 view may also be the same as view A-A shown in FIG. 2. Thus, in FIG. 3, some elements are depicted with reference numerals applicable to the outer liner dilution flow assembly 92, and, in addition, corresponding elements of the inner liner dilution flow assembly 94 are depicted in parentheses. The elements depicted without the corresponding parenthetical element are applicable to both the outer liner dilution flow assembly 92 and the inner liner dilution flow assembly 94. As seen in FIG. 3, the dilution flow assembly 92 (94) includes an upstream liner panel 112 and a downstream liner panel 114. The upstream liner panel 112 is connected to, or engages with, the upstream liner portion 100 (102), and the downstream liner panel 114 is connected to, or engages with the downstream liner portion 104 (106). A dilution opening 118 is provided between the upstream liner panel 112 and the downstream liner panel 114 at the annular gap 108 (110) (FIG. 2). A width of the dilution opening 118 may be the same circumferentially about the outer liner 54 or the inner liner 52, or alternatively, the width of the dilution opening 118 may vary circumferentially so as to provide either more or less dilution air at various locations about the combustion chamber 62. A plurality of rib members 116 are spaced apart from one another in the circumferential direction and extend across the dilution opening 118 to connect the upstream liner panel 112 and the downstream liner panel 114. For example, a first rib member 120 and a second rib member 122 may be spaced apart from one another in the circumferential direction a distance 126, and the second rib member 122, and a third rib member 124 may be spaced apart from one another in the circumferential direction a distance 128. In some aspects, the distance 126 and the distance 128 may be the same for each of the plurality of rib members 116, or the distance 126 and the distance 128 may be different from one another (e.g., the distance 126 may be less than the distance 128). In addition, where the width of the dilution opening 118 varies circumferentially, a length of the rib members 116 across the dilution opening 118 may also vary, depending on the width of the dilution opening 118.

The dilution flow assembly 92 (94) further includes a plurality of dilution fence members 130 arranged within the dilution opening 118 and extending into the combustion chamber 62. The plurality of dilution fence members 130 are connected to the plurality of rib members 116. For example, a first dilution fence member 132 may be connected to the first rib member 120 and the second rib member 122, and a second dilution fence member 134 may be connected to the second rib member 122 and the third rib member 124. As shown in FIG. 3, the plurality of dilution fence members 130 are arranged in successive arrangement in the circumferential direction and are arranged such that successive dilution fence members 130 are alternatingly offset in the axial direction. For example, the first dilution fence member 132 may be arranged a distance 136 from a downstream side 140 of the upstream liner panel 112, and the second dilution fence member 134 may be arranged a distance 138 from the downstream side 140 of the upstream liner panel 112. Thus, the first dilution fence member 132 may be arranged upstream in the axial direction (L) with respect to the second dilution fence member 134.

Figure 4:
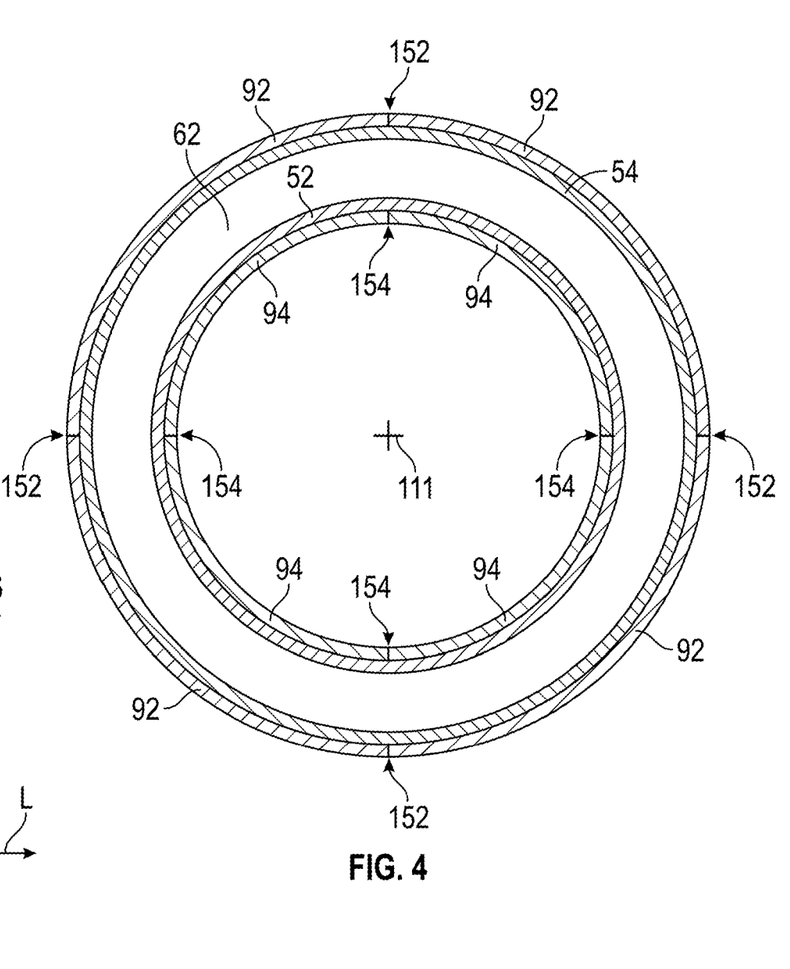
FIG. 4 is a partial cross-sectional view of a combustor taken at plane 4-4 shown in FIGS. 1 and 2, according to an aspect of the present disclosure.

FIG. 4 is a partial cross-sectional view of a combustor liner and dilution flow assemblies, taken at plane 4-4 shown in FIGS. 1 and 2, according to an aspect of the present disclosure. As seen in FIG. 4, a plurality of outer liner dilution flow assemblies 92 may be arranged circumferentially about the outer liner 54. Each one of the plurality of outer liner dilution flow assemblies 92 may be engaged with adjacent ones of the plurality of outer liner dilution flow assemblies 92 at a sealed joint 152. The sealed joint 152 may be arranged such as a rabbet joint, or any other type of joint that may provide a seal between the successive outer liner dilution flow assemblies 92. Similarly, a plurality of inner liner dilution flow assemblies 94 may be arranged circumferentially about the inner liner 52. Each one of the plurality of inner liner dilution flow assemblies 94 may be engaged with adjacent ones of the plurality of inner liner dilution flow assemblies 94 at a sealed joint 154. The sealed joint 154 may be arranged such as a rabbet joint, or any other type of joint that may provide a seal between the successive inner liner dilution flow assemblies 94.

Figure 5:
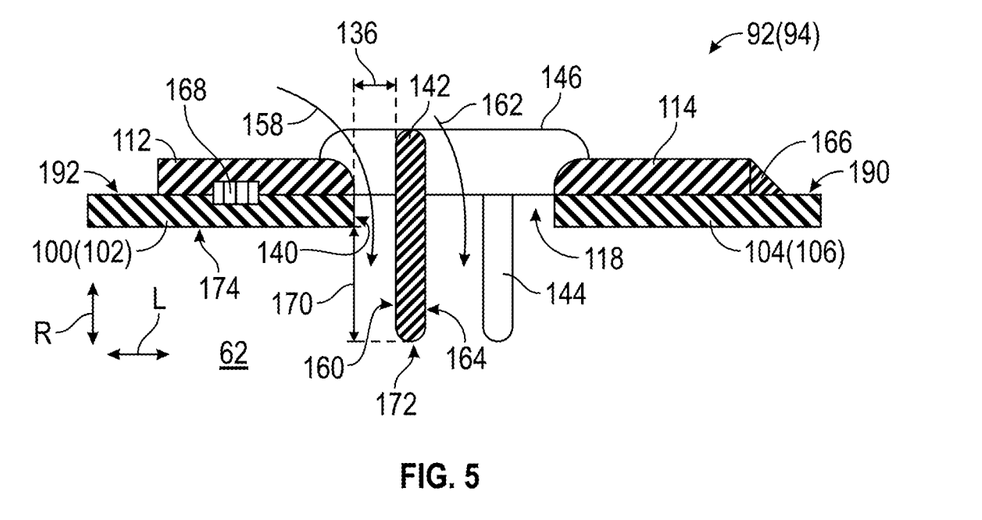
FIG. 5 is a cross-sectional view of an exemplary dilution flow assembly taken at plane 5-5 of FIG. 3, according to an aspect of the present disclosure.

FIG. 5 is a cross-sectional view of the dilution flow assembly 92 (94) taken at plane 5-5 of FIG. 3. In FIG. 5, an upstream dilution fence member 142 is shown arranged within the dilution opening 118. The upstream dilution fence member 142 is connected to a rib member 156 (FIG. 3) and to a rib member 146. The upstream dilution fence member 142 may be arranged at the distance 136 from the downstream side 140 of the upstream liner panel 112. Thus, the upstream dilution fence member 142 is arranged within the dilution opening 118 to provide an upstream dilution flow path 158 between the upstream liner panel 112 and an upstream side 160 of the upstream dilution fence member 142. Similarly, the upstream dilution fence member 142 is arranged within the dilution opening 118 to provide a downstream dilution flow path 162 between a downstream side 164 of the upstream dilution fence member 142 and the downstream liner panel 114. The upstream dilution fence member 142 extends into the combustion chamber 62, and may extend into the combustion chamber a length 170, taken from a hot surface side 174 of the upstream liner portion 100 (102) to a tip 172 of the upstream dilution fence member 142. As shown in FIG. 5, the upstream dilution fence member 142 may generally extend in the radial direction (R) into the combustion chamber 62. However, as will be described below, the upstream dilution fence member 142 may extend at an angle instead.

In FIG. 5, the downstream liner panel 114 is seen to be connected to a downstream liner portion cold surface side 190 of the downstream liner portion 104 (106) via a solid-type connection, such as a welded joint 166. In contrast, the upstream liner panel 112 may engage with an upstream liner portion cold surface side 192 of the upstream liner portion 100 (102) via a floating-type connection, such as providing a seal 168 between the upstream liner portion 100 (102) and the upstream liner panel 112 to create a sealed joint. Of course, a welded joint may be provided as a solid-type connection between the upstream liner portion 100 (102) and the upstream liner panel 112 instead, and a floating-type connection could be provided between the downstream liner portion 104 (106) and the downstream liner panel 114 instead. Alternatively, a solid-type connection may be implemented for both the upstream liner panel 112 and the downstream liner panel 114.

Figure 6:
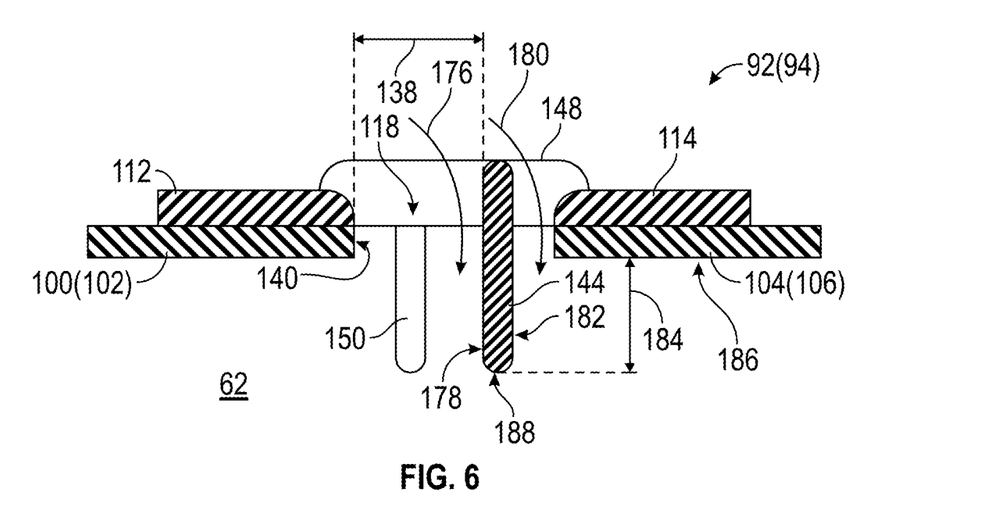
FIG. 6 is a cross-sectional view of an exemplary dilution flow assembly taken at plane 6-6 of FIG. 3, according to an aspect of the present disclosure.

FIG. 6 is a cross-sectional view of the dilution flow assembly 92 (94) taken at plane 6-6 of FIG. 3. In FIG. 6, a downstream dilution fence member 144 is shown arranged within the dilution opening 118. The downstream dilution fence member 144 is connected to the rib member 148 and to a rib member 146 (FIG. 3). The downstream dilution fence member 144 may be arranged at the distance 138 from the downstream side 140 of the upstream liner panel 112. Thus, the downstream dilution fence member 144 is arranged within the dilution opening 118 to provide an upstream flow path 176 between the upstream liner panel 112 and an upstream side 178 of the downstream dilution fence member 144. Similarly, the downstream dilution fence member 144 is arranged within the dilution opening 118 to provide a downstream dilution flow path 180 between a downstream side 182 of the downstream dilution fence member 144 and the downstream liner panel 114. The downstream dilution fence member 144 extends into the combustion chamber 62, and may extend into the combustion chamber a length 184, taken from a hot surface side 186 of the downstream liner portion 104 (106) to a tip 188 of the downstream dilution fence member 144. As shown in FIG. 6, the downstream dilution fence member 144 may generally extend in the radial direction (R) into the combustion chamber 62. However, as will be described below, the downstream dilution fence member 144 may extend at an angle instead. In addition, while FIGS. 5 and 6 generally depict the upstream dilution fence member 142 and the downstream dilution fence member 144 extending into the combustion chamber a same length (i.e., the length 170 and the length 184 are the same), as will be described below, different lengths may be provided for instead.

Figure 7:
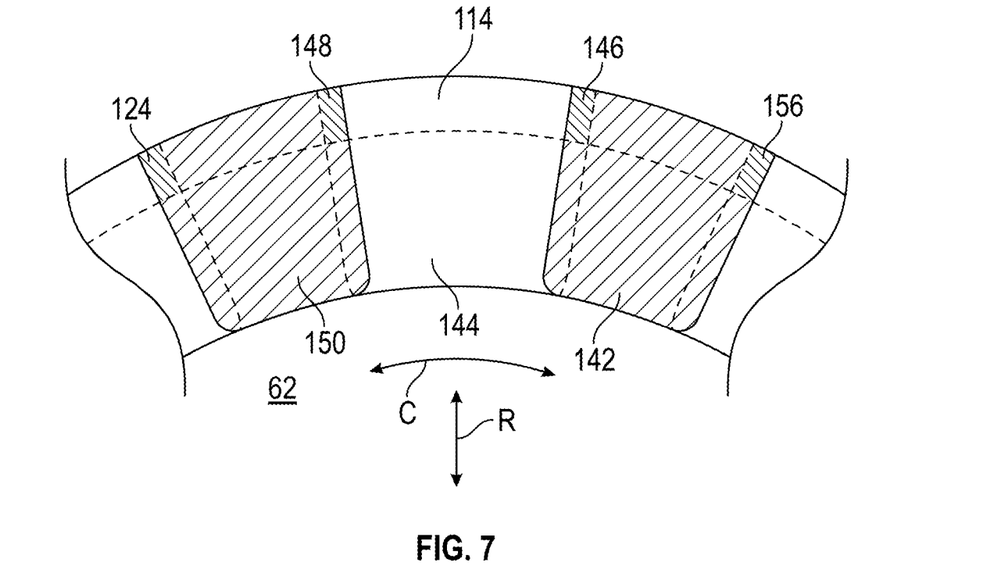
FIG. 7 is a partial cross-sectional aft looking view of a dilution flow assembly taken at plane 7-7 of FIG. 3, according to an aspect of the present disclosure.
Figure 8A:
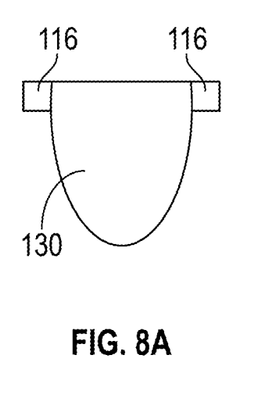
FIGS. 8A to 8E depict various shapes of dilution fence members, according to aspects of the present disclosure.
Figure 8B:
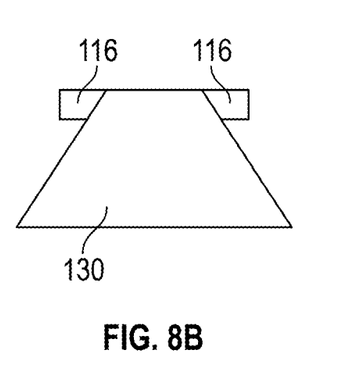
Figure 8C:
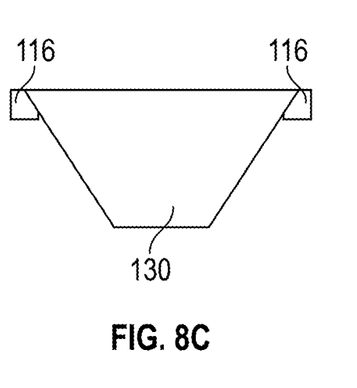
Figure 8D:
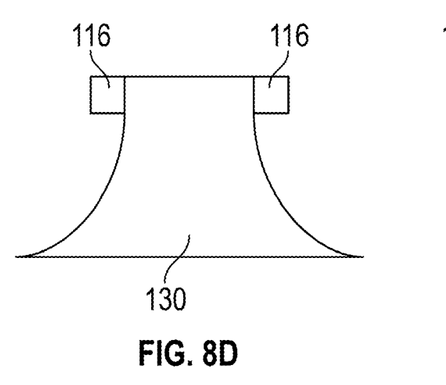
Figure 8E:
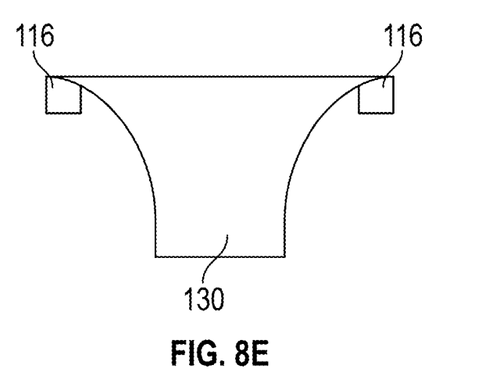

FIG. 7 is a partial cross-sectional aft looking view of a dilution flow assembly taken at plane 7-7 of FIG. 3. As seen in FIG. 7, the upstream dilution fence member 142 and the upstream dilution fence member 150 may have a generally rectangular cross-sectional shape. The downstream dilution fence member 144 may likewise have a generally rectangular cross-sectional shape. Other shapes of the dilution fence members, however, may be utilized. For example, as shown in FIG. 8A, a parabolic shaped or half-oval shaped dilution fence member 130 may be included. Alternatively, as shown in FIG. 8B, a trapezoidal-shaped dilution fence member 130 may be included, or as shown in FIG. 8C, an inverted trapezoidal-shaped dilution fence member 130 may be included. Yet still, as shown in FIG. 8D, a funnel-shaped or lamp-shade shaped dilution fence member 130 may be included, or, as shown in FIG. 8E, an inverted funnel-shaped or inverted lamp-shade shaped dilution fence member 130 may be included. In addition, various combinations of any of the foregoing dilution fence member shapes may be utilized together and implemented within the dilution flow assembly 92 (94).

Figure 9:
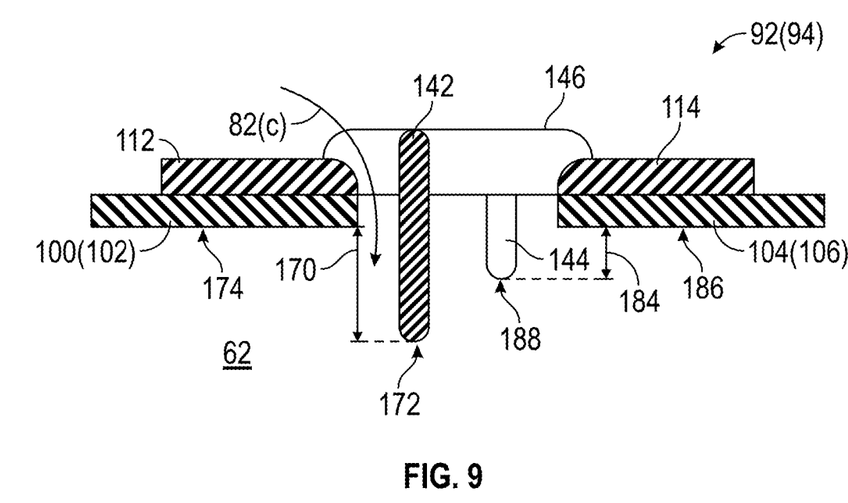
FIG. 9 is a cross-sectional view of alternate arrangements for a dilution flow assembly, taken at plane 5-5 of FIG. 3, according to another aspect of the present disclosure.
Figure 10:
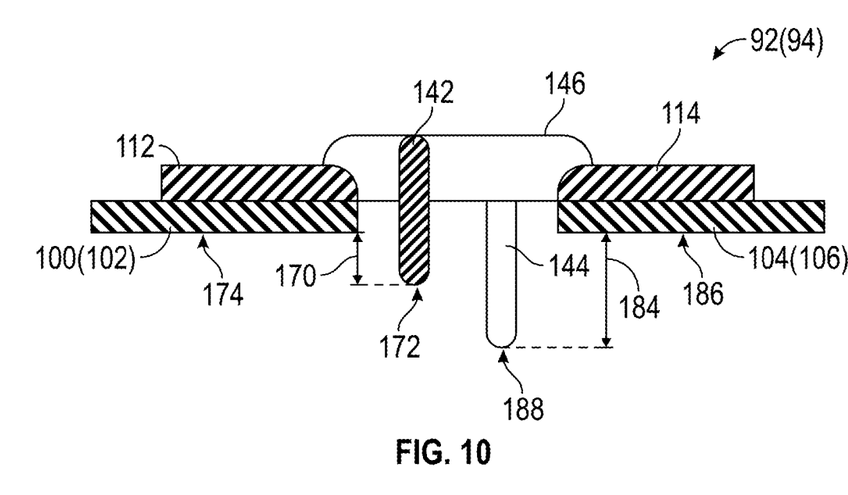
FIG. 10 is a cross-sectional view of alternate arrangements for a dilution flow assembly, taken at plane 5-5 of FIG. 3, according to still another aspect of the present disclosure.

FIGS. 9 and 10 are cross-sectional views of alternate arrangements for the dilution flow assembly 92 (94), taken at plane 5-5 of FIG. 3. The cross sections shown in FIGS. 9 and 10 are similar to the cross sections shown in FIG. 5, but depict arrangements where the upstream dilution fence member 142 and the downstream dilution fence member 144 have different lengths. In the FIG. 9 arrangement, the length 170 of the upstream dilution fence member 142 is greater than the length 184 of the downstream dilution fence member 144. By including a shorter downstream dilution fence member 144, the downstream dilution fence member 144 can help to provide better cooling to the hot surface side 186 of the downstream liner portion 104 (106). Meanwhile, the longer upstream dilution fence member 142 can provide deeper penetration of the dilution air flow 82(c) into the dilution zone 72 of the combustion chamber 62. On the other hand, in the FIG. 10 arrangement, the upstream dilution fence member 142 is shown to have a shorter length 170 than the length 184 of the downstream dilution fence member 144. This arrangement may help to achieve a desired quenching effect of the combustion gases 86 to reduce the NOx emissions. Additionally, while FIGS. 9 and 10 depict varying lengths between the upstream dilution fence member 142 and the downstream dilution fence member 144, varying dilution fence lengths may also be implemented circumferentially. For example, the length 170 of the upstream dilution fence member 142 may be greater than a length 170 of the upstream dilution fence member 150 (FIG. 3).

Figure 11:
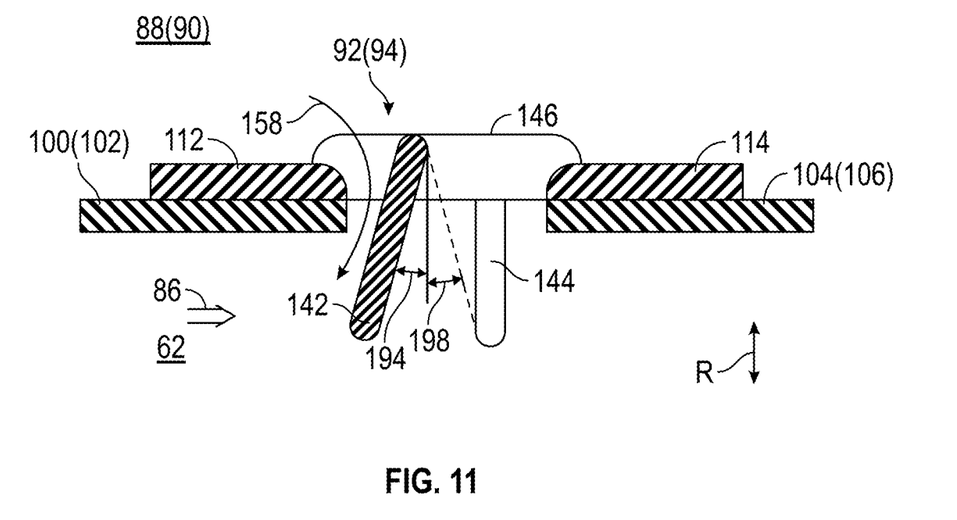
FIG. 11 is a partial cross-sectional view of another arrangement of a dilution flow assembly, taken at plane 5-5 of FIG. 3, according to yet another aspect of the present disclosure.
Figure 12:
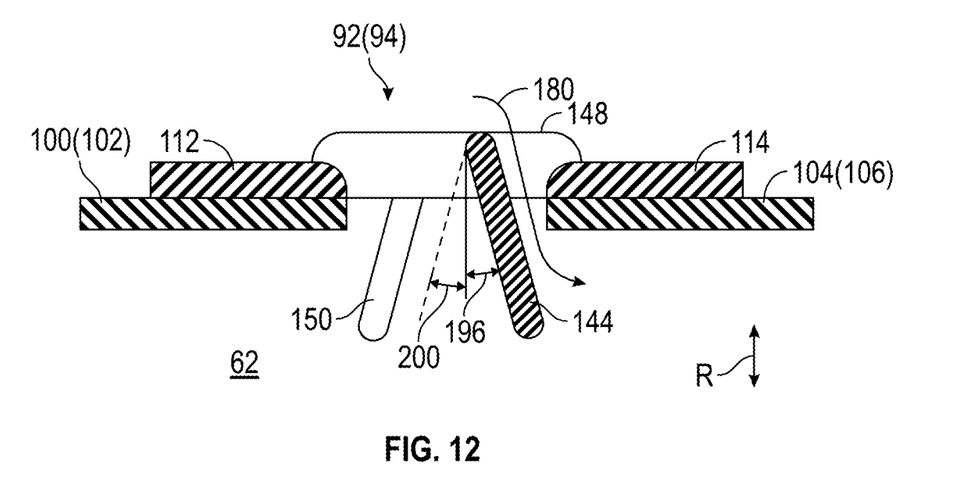
FIG. 12 is a partial cross-sectional view of another arrangement of a dilution flow assembly, taken at plane 6-6 of FIG. 3, according to yet another aspect of the present disclosure.

FIG. 11 is a partial cross-sectional view of another arrangement of a dilution flow assembly, taken at plane 5-5 of FIG. 3. FIG. 12 is a partial cross-sectional view of still another arrangement of a dilution flow assembly, taken at plane 6-6 of FIG. 3. In the arrangements of the dilution flow assembly 92 (94) shown in FIGS. 5 and 6, both the upstream dilution fence member 142 and the downstream dilution fence member 144 are depicted extending in the radial direction into the combustion chamber 62. In contrast, in the FIG. 11 arrangement, the upstream dilution fence member 142 is shown to be arranged at an upstream angle 194. The upstream angle 194 may range from fifteen degrees to thirty degrees. Of course, the upstream angle 194 is not limited to the foregoing range and other angles may be implemented instead. By providing the upstream dilution fence member 142 at the upstream angle 194, greater turbulence can be achieved from the flow of the compressed air 82(c) mixing with the combustion gases 86 within the combustion chamber 62. The upstream dilution fence member 142 is not limited to extending in the radial direction or at the upstream angle 194, and instead, the upstream dilution fence member 142 may extend at a downstream angle 198. The downstream angle 198 may have a range from fifteen degrees to thirty degrees, but other angles may be implemented instead.

In FIG. 11, the downstream dilution fence member 144 is shown extending in the radial direction into the combustion chamber 62. However, as shown in FIG. 12, the downstream dilution fence member 144 may be arranged at a downstream angle 196. The downstream angle 196 may range from fifteen degrees to thirty degrees. Of course, the downstream angle 196 is not limited to the foregoing range and other angles may be implemented instead. By providing the downstream dilution fence member 144 at the downstream angle 196, a faster reattachment of the dilution air from the downstream dilution flow path 180 to the downstream liner portion 104 (106) can be achieved. The downstream dilution fence member 144 is not limited to extending in the radial direction or at the downstream angle 196, and instead, the downstream dilution fence member 144 may extend at an upstream angle 200. The upstream angle 200 may have a range from fifteen degrees to thirty degrees, but other angles may be implemented instead.

In addition to the arrangements shown in FIGS. 11 and 12, the angles of each respective dilution fence member 130 (FIG. 3) may be arranged differently for each dilution fence member 130 in the circumferential direction. For example, referring back to FIG. 3, the upstream dilution fence member 142 may be arranged at the upstream angle 194 as shown in FIG. 11, and the downstream dilution fence member 144 may be arranged at the downstream angle 196 as shown in FIG. 12. Continuing circumferentially, the upstream dilution fence member 150 may be arranged at the downstream angle 198 as shown in FIG. 11, and the downstream dilution fence member 134 may be arranged at the upstream angle 200 as shown in FIG. 12. Thus, each respective dilution fence member 130 may be arranged at a different angle in the circumferential direction.

Figure 13:
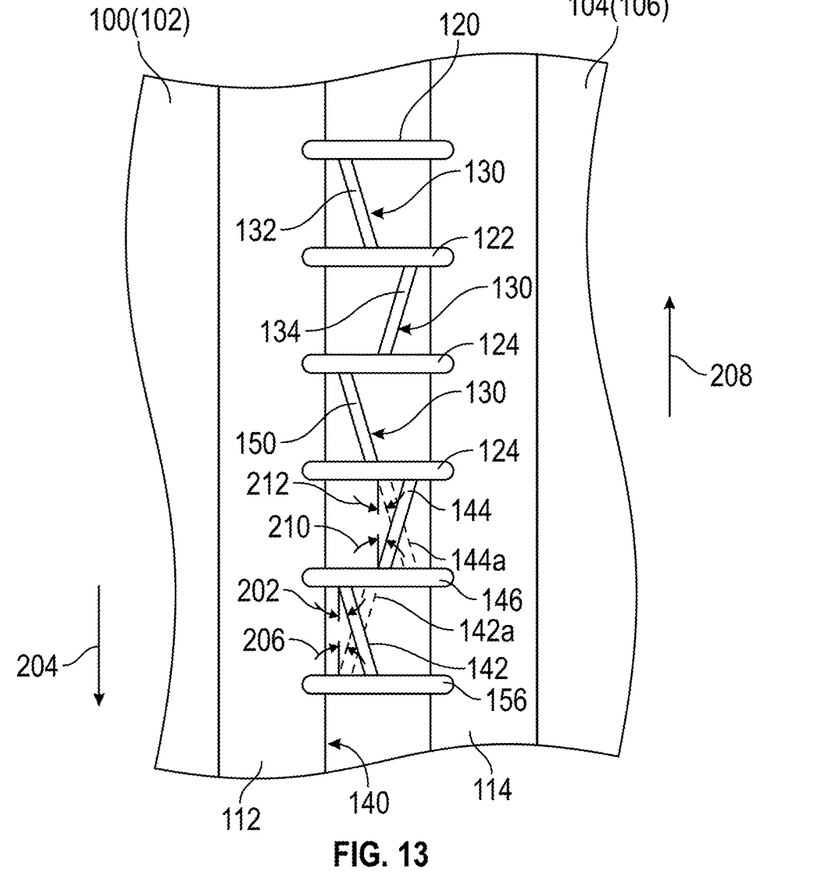
FIG. 13 is a top view depicting a portion of another exemplary dilution flow assembly, taken at view 3-3 or A-A in FIG. 2, according to another aspect of the present disclosure.

FIG. 13 depicts a top view of a portion of another exemplary dilution flow assembly arrangement according to another aspect of the disclosure, taken at view 3-3 or A-A of FIG. 2. In the FIG. 13 arrangement, each of the dilution fence members 130 is arranged to provide a lateral component to the flow of oxidizer into the combustion chamber 62. For example, the upstream dilution fence member 142 may be arranged at an angle 202 with respect to the downstream side 140 of the upstream liner panel 112 so as to provide a lateral component to the flow of oxidizer into the combustion chamber 62 in a first lateral direction 204. Alternatively, the upstream dilution fence member 142 (shown as dilution fence member 142a) may be arranged at an angle 206 with respect to the downstream side 140 of the upstream liner panel 112 so as to provide a lateral component to the flow of oxidizer into the combustion chamber 62 in a second lateral direction 208. Similarly, the downstream dilution fence member 144 may be arranged at an angle 210 with respect to the downstream side 140 of the upstream liner panel 112 so as to provide a lateral component to the flow of oxidizer into the combustion chamber 62 in the second lateral direction 208. Alternatively, the downstream dilution fence member 144 (shown as dilution fence member 144a) may be arranged at an angle 212 with respect to the downstream side 140 of the upstream liner panel 112 so as to provide a lateral flow component to the flow of oxidizer into the combustion chamber 62 in the first lateral direction 204.

In the circumferential arrangement of the dilution fence members 130 about the outer liner 54 or the inner liner 52, the upstream dilution fence members, such as upstream dilution fence members 142, 150, and 132, along with all other upstream dilution fence members, may all be arranged at the same angle 202, or at the same angle 206. Alternatively, each respective upstream dilution fence member may be arranged at a respectively different angle 202 or a respectively different angle 206. Similarly, in the circumferential arrangement of the downstream dilution fence members, such as downstream dilution fence members 134 and 144, along with all other downstream dilution fence members, may all be arranged at the same angle 210, or at the same angle 212. Alternatively, each respective downstream dilution fence member may be arranged at a respectively different angle 210 or a respectively different angle 212. Thus, by providing the upstream dilution fence members and/or the downstream dilution fence members at an angle to provide their respective lateral flow components, better mixing of the dilution oxidizer (air) with the combustion gases in the lateral direction can be achieved.

Figure 14:
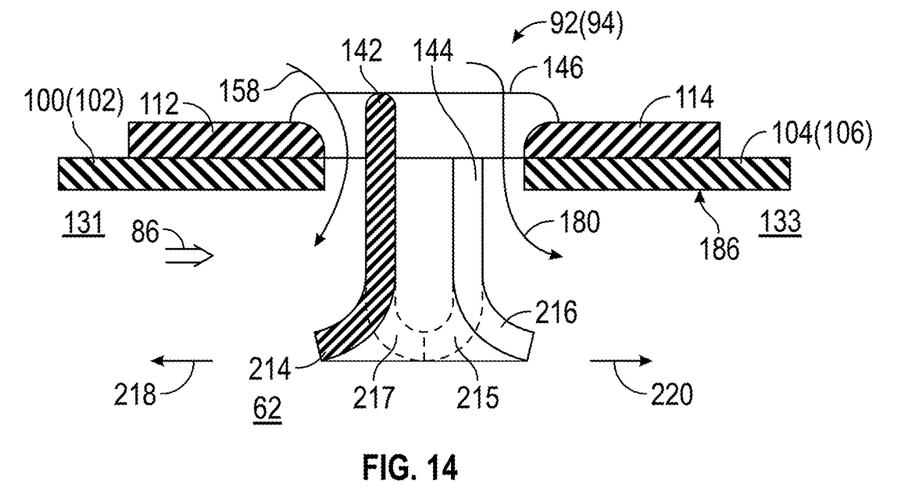
FIG. 14 is a partial cross-sectional view of yet another exemplary dilution flow assembly, taken at plane 5-5 of FIG. 3, according to yet another aspect of the present disclosure.

FIG. 14 is a partial cross-sectional view of a dilution flow assembly according to yet another aspect of the present disclosure, taken at plane 5-5 of FIG. 3. The arrangement of FIG. 14 is similar to that shown in FIG. 5. However, in FIG.

14, the upstream dilution fence member 142 is seen to include an upstream deflector portion 214 that is arranged to deflect the flow of oxidizer from the upstream dilution flow path 158 in an upstream direction 218 (i.e., toward the upstream end 131) within the combustion chamber 62. As shown in FIG. 14, the upstream deflector portion 214 may be implemented in the form of a scoop provided at the tip 172 (FIG. 5) of the upstream dilution fence member 142, where the scoop extends in the upstream direction 218. By providing the upstream deflector portion 214 to the upstream dilution fence member 142, increased turbulence between the flow of the oxidizer from the upstream dilution flow path 158 and the combustion gases 86 may be achieved.

The downstream dilution fence member 144 is seen to include a downstream deflector portion 216 that is arranged to deflect the flow of oxidizer from the downstream dilution flow path 180 in a downstream direction 220 within the combustion chamber 62. Similar to the upstream deflector portion 214, the downstream deflector portion 216 may be implemented as a scoop provided at the tip 188 (FIG. 6) of the dilution fence member 144, where the scoop extends in a downstream direction 220. By providing the downstream deflector portion 216 to the downstream dilution fence member 144, the flow of the oxidizer may result in faster reattachment to the hot surface side 186 of the downstream liner portion 104 (106). Of course, the upstream dilution fence member 142 could be provided with a downstream deflector portion 217 instead of the upstream deflector portion 214, and the downstream dilution fence member 144 could be provided with an upstream deflector portion 215 instead of the downstream deflector portion 216. Of course, the upstream dilution fence 142 could be provided with the upstream deflector portion 214 and the downstream dilution fence 144 could be provided with the upstream deflector portion 215, or the upstream dilution fence 142 could be provided with the downstream deflector portion 217 and the downstream dilution fence 144 could be provided with the downstream deflector portion 216. Additionally, any combination of the upstream and downstream deflector portions could be implemented circumferentially in the successive dilution fences.

The dilution flow assemblies 92 (94) may be produced via individual component parts that may be assembled. For example, the upstream liner panel 112 and the downstream liner panel 114 may be produced from separate metal component parts that are compatible with the upstream liner portion 100 (102) and the downstream liner portion 104 (106). The rib members 116 and the dilution fence members 130 may also be manufactured as individual component parts that can be joined (e.g., welded) to the upstream liner panel 112 and the downstream liner panel 114 so as to manufacture the dilution flow assembly 92 (94). Alternatively, the dilution flow assembly 92 (94) may be produced via an additive manufacturing process.

In the foregoing description, FIGS. 5 to 14 describe various arrangements of the dilution fence members 130 that may be implemented within the outer liner dilution flow assembly 92 or within the inner liner dilution flow assembly 94. Within each of the outer liner dilution flow assembly 92 and/or the inner liner dilution flow assembly 92, any combination of the aspects shown and described in regard to FIGS. 5 to 14 may be implemented. For example, the outer liner dilution flow assembly 92 may include all of the dilution fence members 130 in the arrangements shown in FIGS. 5 and 6. Alternatively, within the outer liner dilution flow assembly 92, different aspects for the dilution fence members 130 may be provided. For example, the outer liner dilution flow assembly 92 may include the dilution fence member 142 as shown in FIG. 4, include the dilution fence member 144 as shown in FIG. 12, and include the dilution fence member 150 as shown in FIG. 13. Thus, any combination of the dilution fence members 130 depicted in FIGS. 5 to 14 may be implemented within the outer liner dilution flow assembly 92 and within the inner liner dilution flow assembly 94.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A combustor liner for a combustor of a gas turbine, the combustor liner defining a circumferential direction about a combustor centerline, an axial direction along the combustor centerline, and a radial direction extending outward from the combustor centerline, the combustor liner comprising: an outer liner extending circumferentially about the combustor centerline; and an inner liner extending circumferentially about the combustor centerline, wherein the outer liner and the inner liner define a combustion chamber therebetween, and at least one of the outer liner and the inner liner includes (a) an upstream liner portion, (b) a downstream liner portion, an annular gap being provided between the upstream liner portion and the downstream liner portion, and (c) at least one dilution flow assembly arranged to bridge across the annular gap, the dilution flow assembly comprising (i) an upstream liner panel, (ii) a downstream liner panel, a dilution opening provided between the upstream liner panel and the downstream liner panel, and (iii) a plurality of dilution fence members arranged within the dilution opening and extending into the combustion chamber, the plurality of dilution fence members being arranged in successive arrangement in the circumferential direction and being arranged such that successive dilution fence members are alternatingly offset in the axial direction.

The combustor liner according to the preceding clause, wherein the upstream liner portion extends in the axial direction from an upstream end of the combustion chamber to a dilution zone of the combustion chamber, the downstream liner portion extends in the axial direction from the dilution zone of the combustion chamber to a downstream end of the combustion chamber, and the annular gap is provided circumferentially between the upstream liner portion and the downstream liner portion at the dilution zone of the combustion chamber.

The combustor liner according to any preceding clause, wherein each dilution fence member among the plurality of dilution fence members is arranged within the dilution opening so as to provide an upstream dilution flow path between the upstream liner panel and an upstream side of the dilution fence member, and to provide a downstream dilution flow path between a downstream side of the dilution fence member and the downstream liner panel.

The combustor liner according to any preceding clause, wherein the at least one dilution flow assembly comprises a plurality of dilution flow assemblies arranged circumferentially about the outer liner and/or the inner liner, and each one of the plurality of dilution flow assemblies engages adjacent ones of the plurality of dilution flow assemblies in the circumferential direction via a sealed joint.

The combustor liner according to any preceding clause, wherein the upstream liner portion includes an upstream liner portion cold surface side, and the downstream liner portion includes a downstream liner portion cold surface side, and the upstream liner panel is connected to the upstream liner portion cold surface side, and the downstream liner panel is connected to the downstream liner portion cold surface side.

The combustor liner according to any preceding clause, wherein the plurality of dilution fence members comprise a cross-sectional shape of, extending in the radial direction and the circumferential direction, one of a rectangular shape, a trapezoidal shape, and a parabolic shape.

The combustor liner according to any preceding clause, wherein the dilution flow assembly is manufactured via an additive manufacturing process.

The combustor liner according to any preceding clause, wherein the dilution flow assembly further comprises (iv) a plurality of rib members spaced apart from one another in the circumferential direction and extending across the dilution opening, the plurality of rib members connecting the upstream liner panel and the downstream liner panel, the plurality of dilution fence members being connected to the plurality of rib members.

The combustor liner according to any preceding clause, wherein the plurality of rib members comprise a first rib member, a second rib member, and a third rib member, and the plurality of dilution fence members comprises a first dilution fence extending between the first rib member and the second rib member, and a second dilution fence extending between the second rib member and the third rib member.

The combustor liner according to any preceding clause, wherein the first rib member and the second rib member are arranged apart from one another a first distance in the circumferential direction, and the second rib member and the third rib member are arranged apart from one another a second distance in the circumferential direction, the second distance being less than the first distance, and the first dilution fence having a greater length in the circumferential direction than that of the second dilution fence.

The combustor liner according to any preceding clause, wherein the first dilution fence is arranged upstream in the axial direction with respect to the second dilution fence.

The combustor liner according to any preceding clause, wherein one of the first dilution fence and the second dilution fence has a greater length extending into the combustion chamber than a length of the other of the first dilution fence and the second dilution fence.

The combustor liner according to any preceding clause, wherein one of the first dilution fence and the second dilution fence extends in the radial direction into the combustion chamber, and the other of the first dilution fence and the second dilution fence extends at an upstream angle into the combustion chamber.

The combustor liner according to any preceding clause, wherein one of the first dilution fence and the second dilution fence extends in the radial direction into the combustion chamber, and the other of the first dilution fence and the second dilution fence extends at an downstream angle into the combustion chamber.

The combustor liner according to any preceding clause, wherein one of the first dilution fence and the second dilution fence extends at an upstream angle into the combustion chamber, and the other of the first dilution fence and the second dilution fence extends at a downstream angle into the combustion chamber.

The combustor liner according to any preceding clause, wherein the first dilution fence is arranged at a first angle with respect to a downstream side of the upstream liner panel so as to provide a lateral flow component to a flow of oxidizer in a first lateral direction, and the second dilution fence is arranged at a second angle with respect to the downstream side of the upstream liner panel so as to provide a lateral flow component to a flow of oxidizer in a second lateral direction.

The combustor liner according to any preceding clause, wherein one of the first dilution fence and the second dilution fence includes an upstream deflector portion arranged to deflect a flow of oxidizer in an upstream direction within the combustion chamber, and the other of the first dilution fence and the second dilution fence includes a downstream deflector portion arranged to deflect a flow of oxidizer in a downstream direction within the combustion chamber.

The combustor liner according to any preceding clause, wherein the upstream deflector portion comprises a scoop provided at a tip of the dilution fence member extending in the upstream direction, and the downstream deflector portion comprises a scoop provided at a tip of the dilution fence member extending in the downstream direction.

The combustor liner according to any preceding clause, wherein the downstream liner panel is connected to the downstream liner portion via a solid-type connection, and the upstream liner panel engages with the upstream liner portion via a floating-type connection.

The combustor liner according to any preceding clause, wherein the solid-type connection is a welded joint, and the floating-type connection includes a seal provided between the upstream liner portion and the upstream liner panel.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor liner for a combustor of a gas turbine, the combustor liner defining a circumferential direction about a combustor centerline, an axial direction along the combustor centerline, and a radial direction extending outward from the combustor centerline, the combustor liner comprising:
  an outer liner extending circumferentially about the combustor centerline; and
  an inner liner extending circumferentially about the combustor centerline,
  wherein the outer liner and the inner liner define a combustion chamber therebetween, and
  at least one of the outer liner and the inner liner includes (a) an upstream liner portion, (b) a downstream liner portion, an annular gap being provided between the upstream liner portion and the downstream liner portion, and (c) at least one dilution flow assembly arranged to bridge across the annular gap, the dilution flow assembly comprising (i) an upstream liner panel, (ii) a downstream liner panel, a dilution opening provided between the upstream liner panel and the downstream liner panel, and (iii) a plurality of dilution fence members arranged within the dilution opening and extending into the combustion chamber, the plurality of dilution fence members being arranged in successive arrangement in the circumferential direction and being arranged such that successive dilution fence members are alternatingly offset in the axial direction.

2. The combustor liner according to claim 1, wherein the upstream liner portion extends in the axial direction from an upstream end of the combustion chamber to a dilution zone of the combustion chamber, the downstream liner portion extends in the axial direction from the dilution zone of the combustion chamber to a downstream end of the combustion chamber, and the annular gap is provided circumferentially between the upstream liner portion and the downstream liner portion at the dilution zone of the combustion chamber.

3. The combustor liner according to claim 1, wherein each dilution fence member among the plurality of dilution fence members is arranged within the dilution opening so as to provide an upstream dilution flow path between the upstream liner panel and an upstream side of the dilution fence member, and to provide a downstream dilution flow path between a downstream side of the dilution fence member and the downstream liner panel.

4. The combustor liner according to claim 1, wherein the at least one dilution flow assembly comprises a plurality of dilution flow assemblies arranged circumferentially about the outer liner and/or the inner liner, and each one of the plurality of dilution flow assemblies engages adjacent ones of the plurality of dilution flow assemblies in the circumferential direction via a sealed joint.

5. The combustor liner according to claim 1, wherein the upstream liner portion includes an upstream liner portion cold surface side, and the downstream liner portion includes a downstream liner portion cold surface side, and the upstream liner panel is connected to the upstream liner portion cold surface side, and the downstream liner panel is connected to the downstream liner portion cold surface side.

6. The combustor liner according to claim 1, wherein the plurality of dilution fence members comprise a cross-sectional shape of, extending in the radial direction and the circumferential direction, one of a rectangular shape, a trapezoidal shape, and a parabolic shape.

7. The combustor liner according to claim 1, wherein the dilution flow assembly is manufactured via an additive manufacturing process.

8. The combustor liner according to claim 1, wherein the dilution flow assembly further comprises (iv) a plurality of rib members spaced apart from one another in the circumferential direction and extending across the dilution opening, the plurality of rib members connecting the upstream liner panel and the downstream liner panel, the plurality of dilution fence members being connected to the plurality of rib members.

9. The combustor liner according to claim 8, wherein the plurality of rib members comprise a first rib member, a second rib member, and a third rib member, and the plurality of dilution fence members comprises a first dilution fence extending between the first rib member and the second rib member, and a second dilution fence extending between the second rib member and the third rib member.

10. The combustor liner according to claim 9, wherein the first rib member and the second rib member are arranged apart from one another a first distance in the circumferential direction, and the second rib member and the third rib member are arranged apart from one another a second distance in the circumferential direction, the second distance being less than the first distance, and the first dilution fence having a greater length in the circumferential direction than that of the second dilution fence.

11. The combustor liner according to claim 9, wherein the first dilution fence is arranged upstream in the axial direction with respect to the second dilution fence.

12. The combustor liner according to claim 11, wherein one of the first dilution fence and the second dilution fence has a greater length extending into the combustion chamber than a length of the other of the first dilution fence and the second dilution fence.

13. The combustor liner according to claim 11, wherein one of the first dilution fence and the second dilution fence extends in the radial direction into the combustion chamber, and the other of the first dilution fence and the second dilution fence extends at an upstream angle into the combustion chamber.

14. The combustor liner according to claim 11, wherein one of the first dilution fence and the second dilution fence extends in the radial direction into the combustion chamber, and the other of the first dilution fence and the second dilution fence extends at an downstream angle into the combustion chamber.

15. The combustor liner according to claim 11, wherein one of the first dilution fence and the second dilution fence extends at an upstream angle into the combustion chamber, and the other of the first dilution fence and the second dilution fence extends at a downstream angle into the combustion chamber.

16. The combustor liner according to claim 11, wherein the first dilution fence is arranged at a first angle with respect to a downstream side of the upstream liner panel so as to provide a lateral flow component to a flow of oxidizer in a first lateral direction, and the second dilution fence is arranged at a second angle with respect to the downstream side of the upstream liner panel so as to provide a lateral flow component to a flow of oxidizer in a second lateral direction.

17. The combustor liner according to claim 11, wherein one of the first dilution fence and the second dilution fence includes an upstream deflector portion arranged to deflect a flow of oxidizer in an upstream direction within the combustion chamber, and the other of the first dilution fence and the second dilution fence includes a downstream deflector portion arranged to deflect a flow of oxidizer in a downstream direction within the combustion chamber.

18. The combustor liner according to claim 17, wherein the upstream deflector portion comprises a scoop provided at a tip of the dilution fence member extending in the upstream direction, and the downstream deflector portion comprises a scoop provided at a tip of the dilution fence member extending in the downstream direction.

19. The combustor liner according to claim 1, wherein the downstream liner panel is connected to the downstream liner portion via a solid-type connection, and the upstream liner panel engages with the upstream liner portion via a floating-type connection.

20. The combustor liner according to claim 19, wherein the solid-type connection is a welded joint, and the floating-type connection includes a seal provided between the upstream liner portion and the upstream liner panel.

* * * * *